(12) United States Patent
Franciosa et al.

(10) Patent No.: US 7,370,034 B2
(45) Date of Patent: May 6, 2008

(54) SYSTEM AND METHOD FOR PERFORMING ELECTRONIC INFORMATION RETRIEVAL USING KEYWORDS

(75) Inventors: Alain Franciosa, Meylan (FR); Christopher R Dance, La Terrasse (FR)

(73) Assignee: Xerox Corporation, Norwalk, CT (US)

( * ) Notice: Subject to any disclaimer, the term of this patent is extended or adjusted under 35 U.S.C. 154(b) by 312 days.

(21) Appl. No.: 10/605,630

(22) Filed: Oct. 15, 2003

(65) Prior Publication Data

US 2005/0086205 A1    Apr. 21, 2005

(51) Int. Cl.
*G06F 7/00*    (2006.01)
*G06F 17/30*   (2006.01)

(52) U.S. Cl. ............................. 707/3; 707/4; 707/104.1
(58) Field of Classification Search .................... 707/3, 707/4, 5, 104.1
See application file for complete search history.

(56) References Cited

U.S. PATENT DOCUMENTS

| | | | | |
|---|---|---|---|---|
| 4,991,094 A | * | 2/1991 | Fagan et al. .................... 704/9 |
| 5,465,353 A | | 11/1995 | Hull et al. ................... 395/600 |
| 5,486,686 A | | 1/1996 | Zdybel, Jr. et al. .......... 235/375 |
| 5,629,980 A | | 5/1997 | Stefik et al. .................... 380/4 |
| 5,634,012 A | | 5/1997 | Stefik et al. ................. 395/239 |
| 5,638,443 A | | 6/1997 | Stefik et al. .................... 380/4 |
| 5,715,403 A | | 2/1998 | Stefik .......................... 395/244 |
| 5,748,805 A | | 5/1998 | Withgott et al. ............. 382/306 |
| 5,781,914 A | | 7/1998 | Stork et al. .................. 707/506 |
| 5,802,515 A | | 9/1998 | Adar et al. ...................... 707/5 |
| 5,848,413 A | | 12/1998 | Wolff ............................ 707/10 |
| 5,893,908 A | | 4/1999 | Cullen et al. .................... 707/5 |
| 5,987,448 A | * | 11/1999 | Evans et al. .................... 707/3 |
| 5,987,457 A | | 11/1999 | Ballard et al. |
| 6,041,323 A | * | 3/2000 | Kubota ........................... 707/5 |
| 6,105,023 A | * | 8/2000 | Callan ............................. 707/5 |
| 6,212,517 B1 | * | 4/2001 | Sato et al. ....................... 707/5 |
| 6,236,971 B1 | | 5/2001 | Stefik et al. ..................... 705/1 |

(Continued)

FOREIGN PATENT DOCUMENTS

EP    0 725 353 A1    8/1996

(Continued)

OTHER PUBLICATIONS

U.S. Appl. No. 09/361,496, entitled "System and Method of Automatic Wrapper Grammar Generation", filed Jul. 26, 1999.

(Continued)

*Primary Examiner*—Hosain Alam
*Assistant Examiner*—Usmaan Saeed
(74) *Attorney, Agent, or Firm*—Fay Sharpe LLP

(57) ABSTRACT

Output documents similar to an input document are identified. A query is formulated using a list of best keywords from the input document to search for a first set of output documents. The list of best keywords is defined with a maximum number of keywords less than the total number of keywords in the list of best keywords that are identified as belonging to a domain specific dictionary of words and as having no measurable linguistic frequency. Lists of keywords are identified for each output document in the first set of documents. A second set of similar documents is determined using a measure of similarity that is computed between keywords identified in the input document and each output document in the first set of documents.

19 Claims, 8 Drawing Sheets

U.S. PATENT DOCUMENTS

| | | | |
|---|---|---|---|
| 6,348,970 B1 | 2/2002 | Marx | 358/1.15 |
| 6,363,381 B1 | 3/2002 | Lee et al. | 707/6 |
| 6,396,951 B1 | 5/2002 | Grefenstette | 382/187 |
| 6,397,213 B1 | 5/2002 | Cullen et al. | 707/5 |
| 2002/0103834 A1* | 8/2002 | Thompson et al. | 707/526 |
| 2002/0118379 A1 | 8/2002 | Chakraborty | |
| 2002/0156763 A1 | 10/2002 | Giovanni | |
| 2002/0165856 A1* | 11/2002 | Gilfillan et al. | 707/3 |
| 2003/0172066 A1 | 9/2003 | Cooper | |
| 2003/0200078 A1* | 10/2003 | Luo et al. | 704/2 |
| 2004/0015784 A1 | 1/2004 | Chidlovskii | 715/530 |
| 2004/0068495 A1* | 4/2004 | Inaba et al. | 707/3 |
| 2004/0220919 A1* | 11/2004 | Kobayashi | 707/3 |
| 2004/0267734 A1* | 12/2004 | Toshima | 707/3 |
| 2005/0187931 A1* | 8/2005 | Cofino et al. | 707/5 |

FOREIGN PATENT DOCUMENTS

| EP | 1 168202 A | 1/2002 |
|---|---|---|
| JP | 2003 108579 A | 4/2003 |

OTHER PUBLICATIONS

E. Kuruoglu & V. Tan, "Document Image Retrieval without OCRing Using a Video Scanning System", Proc ACM International Workshop on Multimedia Information Retrieval Oct. 30, 2000-Nov. 4, 2000, Los Angeles California.

European Search Report EP 04 02 4558 dated Apr. 6, 2006.

* cited by examiner

CALCULATE_SIMILARITY [D1,D2] -calculates the similarity between documents D1 and D2
- Input:
  - D1: List of keywords of the input document
  - D2: List of keywords of document from search results
- Output:
  - Similarity "S": The computed similarity between D1 and D2
{

502 ⎰ For the document D1, calculate with the keyword weights of D1:
     ⎰ • unique attributes sum: Sum1 = the sum of the weights of keywords in D1 that do not appear in D2
     ⎱ • total sum: Sum2 = the sum of the weights of keywords in D1

504 ⎰ • shared sum: Sum3 = the sum of the weights of keywords in D1 that also appear in D2
     ⎱ • ratio: R = (the number of keywords in D1 not in D2)/(the number of keywords in D1)

For the document D2, calculate with the keyword weights of D2:
  • unique attributes sum: Sum4 = the sum of the weights of keywords in D2 that do not appear in D1
  • shared sum: Sum5 = the sum of weights of keywords in D2 that also appear in D1

506 ⎰ If D1 originates from a hardcopy document, calculate the tolerance ratio "T":
     ⎱ K = a constant defined by OCR error rate at the keyword level, if no OCR error is detected, K is set to 0
     T = K* (Sum2 − Sum3)/(Sum2)

508 ⎰ Calculate the inclusion ratio "I" (i.e., percentage of keywords from D1 that are in D2):
     ⎱ I = (Sum3)/(Sum2) + T

If I>90% (i.e., if an inclusion is detected, e.g., 90 % of the keywords from D1 are in D2):
  Sum6 = Ordered_Sum [D1,D2] - sum of the weights of keywords in D1
                                  with same neighbors in D2 (SEE FIG. 7)
  • Calculate ordered inclusion ratio "I2":
      I2 = (Sum6)/(Sum2)
      if (I2>I) then S = I
      else
          if (D1 originates from a hardcopy document and I2>50%)
              if (R<20 %) then S = I else S = I2
          else S = I2
*510* else (i.e., if no inclusion is detected):
  • Calculate the Jaccard similarity distance measure:
      Sum7 = Sum1 + Sum4 + Sum5
      S = (Sum5) / (Sum7)
  • If S>90% : (a revision is detected, i.e., Jaccard similarity S>90 %;
               otherwise a related document may be detected)
      Sum8 = Ordered_Sum [D2,D1] - sum of the weights of keywords from D2
                                      with same neighbors in D1
  • Calculate ordered similarity:
      S2 = (Sum8) / (Sum1 + Sum4 + Sum8)
      if (S2 > S)
          if (D1 originates from a hardcopy document)
              if (S2>50%)
                  if (R>20%) then  S = S1
                  else S = S1
          else S = S1
*512*

*FIG. 6*

Ordered_Sum [L1, L2] - calculates sum of the weights of keywords from L1 with same neighbors in L2
- Input:
  - L1: List 1
  - L2: List 2
- Output
  - Sum: the ordered sum 600 { Define the tolerance "T" minimal percentage for neighbors :
T = K*50%, where K depends on the OCR error at the keyword level for each term t (i.e., keyword) of L1:
   identify all possible positions Pi of term t in L2
   if (t exists in L2)
      identify N neighbors on both sides of term t in L1
      (by default N=5 and depends on the position of the term in the L1)

for each position Pi of term t found in L2:
602 {      if the position Pi of the term t is at a limit of L2: (Pi<N or Pi>(L2 size-N))
         increase the ordered sum with the weight of term t in L1: Sum += Wt
     else
606 {      identify N neighbors on both sides of term t in L2
      Calculate the percentage of common neighbors "C" of term t between L1 and L2
      if ( C > 80% - T)   increase the ordered sum with the weight of term t in L1: Sum += Wt 604 {   else
     increase the ordered sum with the weight of term t in L1: Sum += Wt
}

*FIG. 7*

SYSTEM AND METHOD FOR PERFORMING ELECTRONIC INFORMATION RETRIEVAL USING KEYWORDS

CROSS REFERENCE TO RELATED APPLICATIONS

"SYSTEM AND METHOD FOR COMPUTING A MEASURE OF SIMILARITY BETWEEN DOCUMENTS," Alain Franciosa et al., application Ser. No. 10/605,631, filed concurrently herewith and incorporated herein by reference.

BACKGROUND OF INVENTION

1. Field of the Invention

The present invention relates generally to a method and apparatus for identifying similar documents, and more particularly, to a method and apparatus for identifying a set of output documents that are similar to a given input document that may be a hardcopy or an electronic document.

2. Description of Related Art

Generally, hardcopy documents continue to be used as a medium for exchanging human readable information. However, existing electronic document processing systems, on which electronic documents are generated and later transformed to hardcopy documents using printers or the like, have created a need to recover an electronic representation of a hardcopy document.

The need to recover electronic representations of hardcopy documents arises for reasons of efficiency and quality. Generally, a document in electronic form can be used to produce hardcopy reproductions with greater quality than if they were reproduced from one of the hardcopy reproductions. Also, it is generally more efficient when revising a document to start from its electronic form than its scanned and OCRed counterpart.

U.S. Pat. No. 5,486,686, entitled "Hardcopy lossless data storage and communications for electronic document processing systems", which is incorporated herein by reference, provides one solution to this problem by allowing hardcopy documents to record thereon machine readable electronic domain definitions of part or all of the electronic descriptions of hardcopy documents and/or of part or all of the transforms that are performed to produce or reproduce such hardcopy documents.

Another solution is disclosed in U.S. Pat. No. 5,893,908, entitled "Document management system", which provides automatic archiving of documents along with a descriptor of the stored document to facilitate its retrieval. The system includes a digital copier alert that provides an alert when an electronic representation of a hardcopy document sought to be copied is identified. Further, the document management system automatically develops queries based on a page or icon that can then be used to search archived documents.

However, these and other known solutions lack flexibility by either requiring a hardcopy document to include machine readable instructions or pre-processed feature information associated with electronic documents. Accordingly, it would be desirable to provide a system that is adapted to locate electronic representations of hardcopy documents independent of machine readable information and pre-processed descriptions. Such a system would advantageously operate using either hardcopy or electronic forms of documents as input.

SUMMARY OF INVENTION

In accordance with one aspect of the invention there is provided a method, system and article of manufacture therefore, for identifying output documents similar to an input document. The method involves: (a) identifying a predefined number of keywords from a first list of rated keywords extracted from the input document to define a list of best keywords; the list of best keywords having a rating greater (e.g., a greater weight) than other keywords in the first list of keywords except for keywords belonging to a domain specific dictionary of words and having no measurable linguistic frequency (i.e., no measured linguistic frequency or a measured linguistic frequency below a predefined threshold); (b) formulating a query using the list of best keywords; (c) performing the query to assemble a first set of output documents; (d) identifying lists of keywords for each output document in the first set of documents; (e) computing a measure of similarity between the input document and each output document in the first set of documents; (f) defining a second set of documents with each document in the first set of documents for which its computed measure of similarity with the input document is greater than a predetermined threshold value; wherein the list of best keywords has a maximum number of keywords less than the number of keywords in the list of best keywords that are identified as belonging to a domain specific dictionary of words and having no measurable linguistic frequency.

In accordance another aspect of the invention, there is provided a method, system and article of manufacture therefore, for computing ratings of keywords extracted from an input document. The method involves: (a) determining if each keyword in the list of keywords exists in a domain specific dictionary of words; (b) determining a frequency of occurrence in the input document for each keyword in the list of keywords, also referred to as its term frequency; (c) for each keyword identified at (a) that exists in the domain specific dictionary of words, assigning each keyword its linguistic frequency if one exists from a database of linguistic frequencies defined using a collection of documents, and assigning its linguistic frequency to a predefined small value if one does not exist in the database of linguistic frequencies; (d) for each keyword that was not identified in the domain specific dictionary of words at (a), assigning each keyword its linguistic frequency, if one exists, in the database of linguistic frequencies; and (e) for each keyword in the list of keywords to which a term frequency and a linguistic frequency are assigned, computing a rating corresponding to its importance in the input document that is a function of its frequency of occurrence in the input document and its frequency of occurrence in the collection of documents.

As will be appreciated, the method and system for identifying output documents similar to an input document can be used to carry out additional applications that include automatically carry out a query for similar documents, categorizing, indexing, and clustering documents, filtering document content such as spam, detecting duplicate documents in applications such as archiving, detecting use of copyrighted documents, and identifying the language of a document.

Advantageously the method, and system therefor, for identifying output documents similar to an input document: (a) selects keywords in the documents and accounts for the presence of OCR errors; (b) accounts for keywords that exist in domain specific dictionaries but have no measurable linguistic frequency; (c) is adapted to verify that keywords exist in the source language of a document; (d) permits searching for similar documents using the keywords in a multilingual document that are translated and keywords identified in OCRed images of electronic documents; (f) is adapted to summarize search results.

BRIEF DESCRIPTION OF DRAWINGS

These and other aspects of the invention will become apparent from the following description read in conjunction with the accompanying drawings wherein the same reference numerals have been applied to like parts and in which:

FIGS. 5 and 6 sets forth pseudo code depicting computational operations of a method for calculating the distance between two documents;

FIG. 7 sets forth pseudo code for computing the ordered sum of keywords forming part of two documents.

DETAILED DESCRIPTION

A. System Overview

Figure 1:
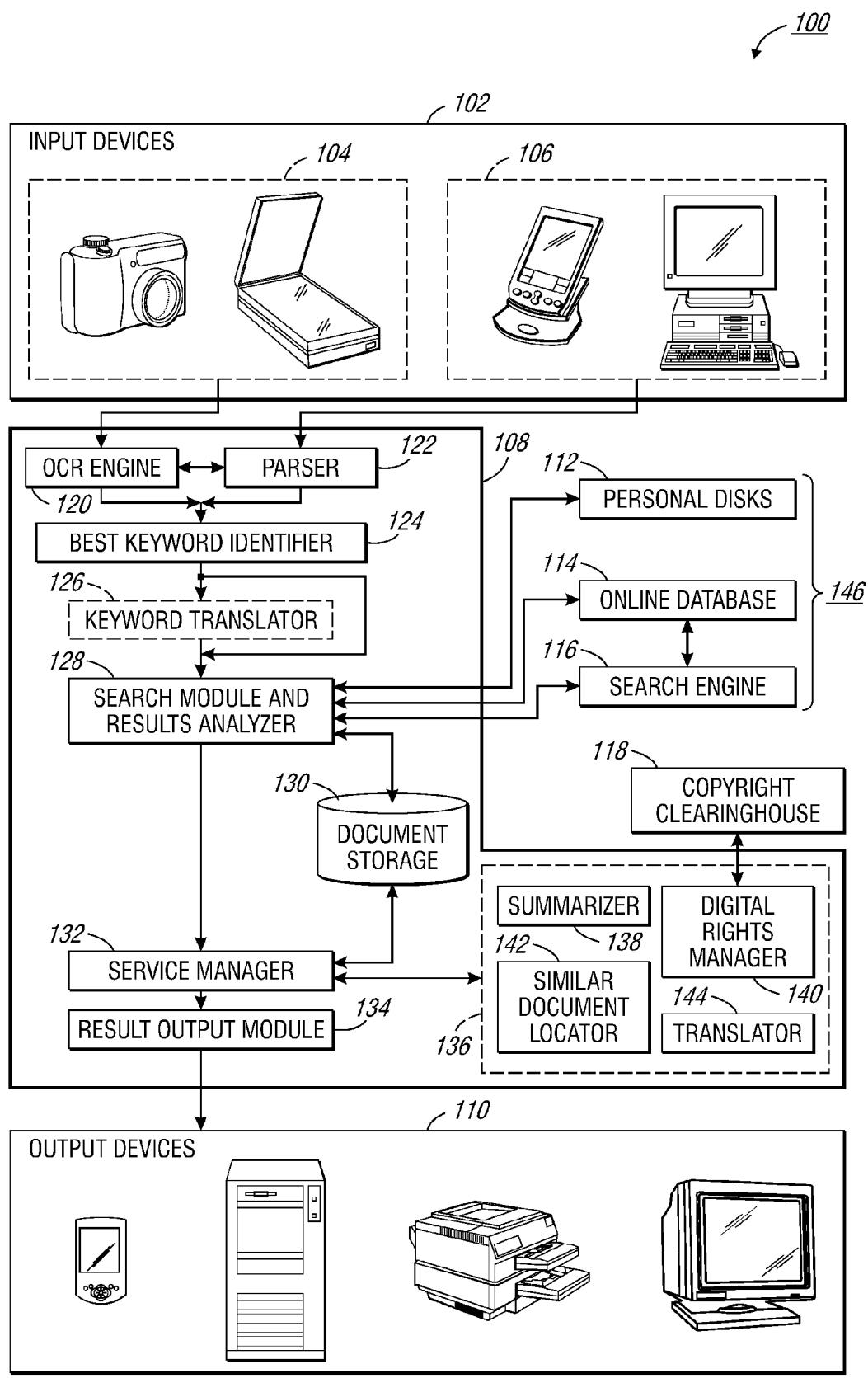
FIG. 1 illustrates an example of the general operating environment for carrying out the invention.

FIG. 1 illustrates an example of the general operating environment 100 for performing electronic information retrieval using keywords. The general operating environment 100 includes input devices 102, electronic search system 108, and output devices 110. The input devices 102 include devices 104 adapted to capture hardcopy documents such as cameras and scanners and devices 106 adapted to create or store electronic documents such as computers and digital assistants.

Generally, search requests are received and acted on by the electronic search system 108. Each search request includes input provided from the input devices 110 that is used by the electronic search system 108 to identify documents similar to a specified input document. In one embodiment, the search request includes in addition to an input document, a search context that more fully defines parameters of desired results and a job context that provides domain, work group, and/or user parameters. Alternate embodiments may not include search contexts along with an input document in which case the electronic search system 108 uses a default search context.

The job context may specify, for example, a profile list that includes specific, machines, directories and associated account information to conduct a search for documents similar to an input document. Further the job context may specify the duration a search should persist before it is automatically terminated if no results are identified. Also the job context may specify account information for use at copyright clearinghouse 118.

In one embodiment, the search context specifies parameters for a search list, a service list, a found document format, an extraction mechanism, a maximum length, a number of matching documents, a search type, and a quality. The search list parameter may be used to specify a list of sites at which to either specifically search or to augment a search. The sites may include search engines, databases, and servers, with access that may or may not be restricted. The service list parameter may be used to specify a list of services that may be applied to the results, including but not limited to translation, summarization, enrichment, and format conversion.

The found document format parameter may be used to specify that the type of documents the electronic search system 108 should look for is one of a limited subset of document formats (e.g., PDF, Word, HTML, ASCII, PowerPoint, Excel) or alternatively is any type of document format. The extraction mechanism parameter may be used to specify that a preferred OCR engine or parsing engine be used to process an input document. The maximum length parameter may be used to specify limits that the search results should not exceed, such as per document criteria (e.g., pages, words, size, etc.). The number of matching documents parameter may be used to specify a not-to-exceed limit for the number of documents that make up the search results.

The quality parameter may be used to specify how similar the search results should be relative to the input document (e.g., high or matching, medium or revision, low or related). In one embodiment, the quality parameters is specified by a user to identify the type of results desired. For example, the desired results may include only one or a combination of different types of similar documents or different levels of results (e.g., documents that are likely an exact match of the input document, documents that are likely revisions of the input document, or documents that are likely only related to the input document).

Depending on the level of results desired, the electronic search system 108 searches for similar documents that satisfy the level of results desired. Thus, "similar document" sought by the electronic search system 108 comprise documents that have a distance from the input document greater than a quality threshold, which is defined as the minimum distance value similar documents should have to be considered relevant (e.g., a revision is considered relevant if it is approximately 90% similar to the original).

The system is adapted to recover desired results with complete or incomplete representations of the desired results (e.g., pages of the input document missing, or portions of the input document blanked out). For example one embodiment, original electronic documents may be recovered from complete or incomplete HTML, Microsoft Word, PDF, PowerPoint, Excel, ASCII, or OCRed ASCII documents.

Figure 2:
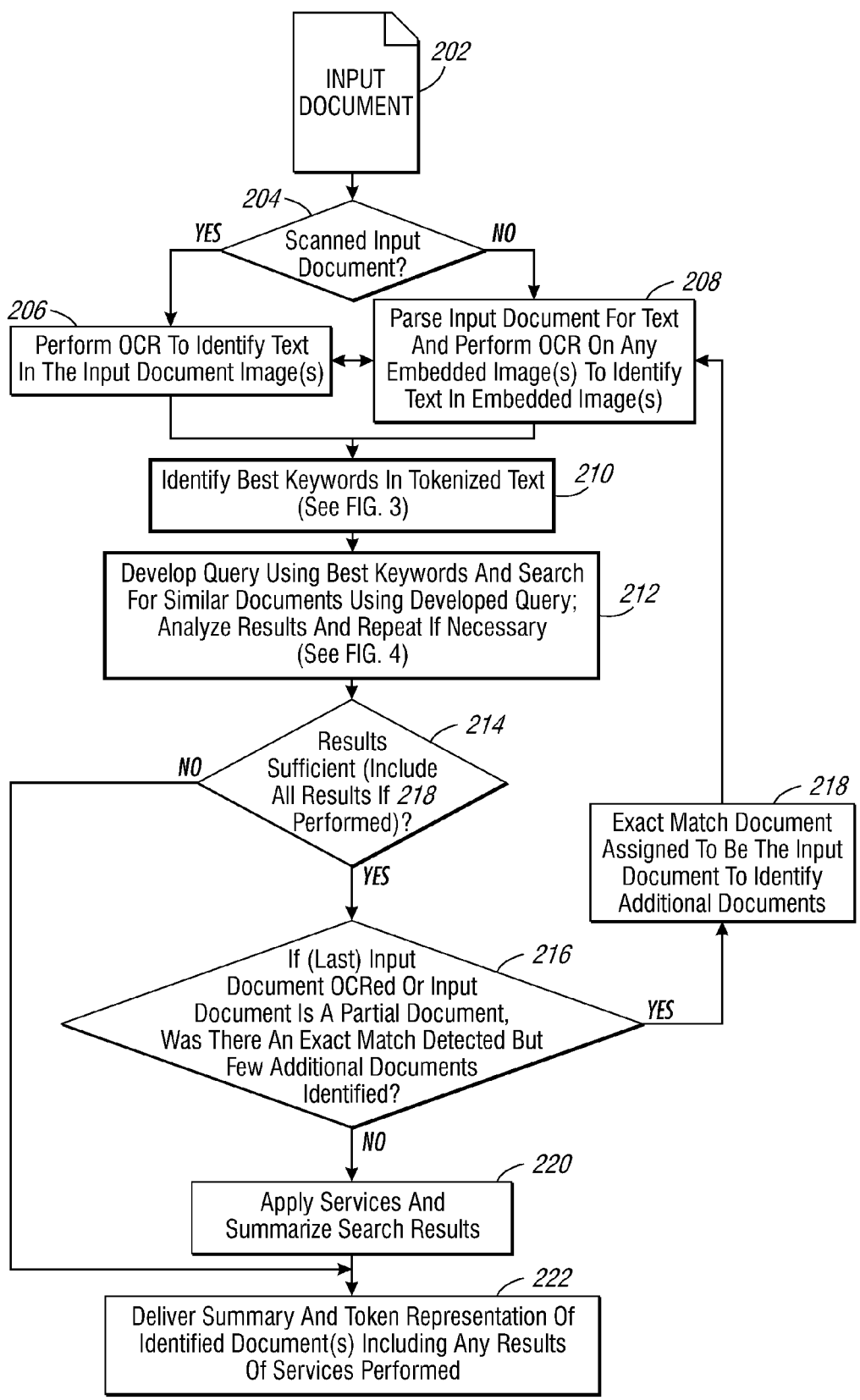
FIG. 2 is a flow diagram setting forth the general steps for locating and identifying output documents similar to a given input document.

FIG. 2 is a flow diagram that sets forth the general steps performed by the electronic search system 108 for locating and identifying output documents similar to an input document 202, which may be received from any one of the input devices 102. In the event the input document 202 is determined or identified to be scanned at 204, optical character recognition (OCR) is performed on its contents at 206 using OCR engine 120 to identify textual content in the input document's image(s); otherwise, the input document is parsed by parser 122 for text at 208.

In addition at 208, embedded images identified by the parser 122 are processed by OCR engine 120 to identify textual content therein. For example, in one embodiment the parser 122 parses HTML and PDF formatted documents to extract full ASCII text. In the event a bitmap image is encountered when parsing the document, the bitmap image is OCRed and the text therein identified.

Figure 3:
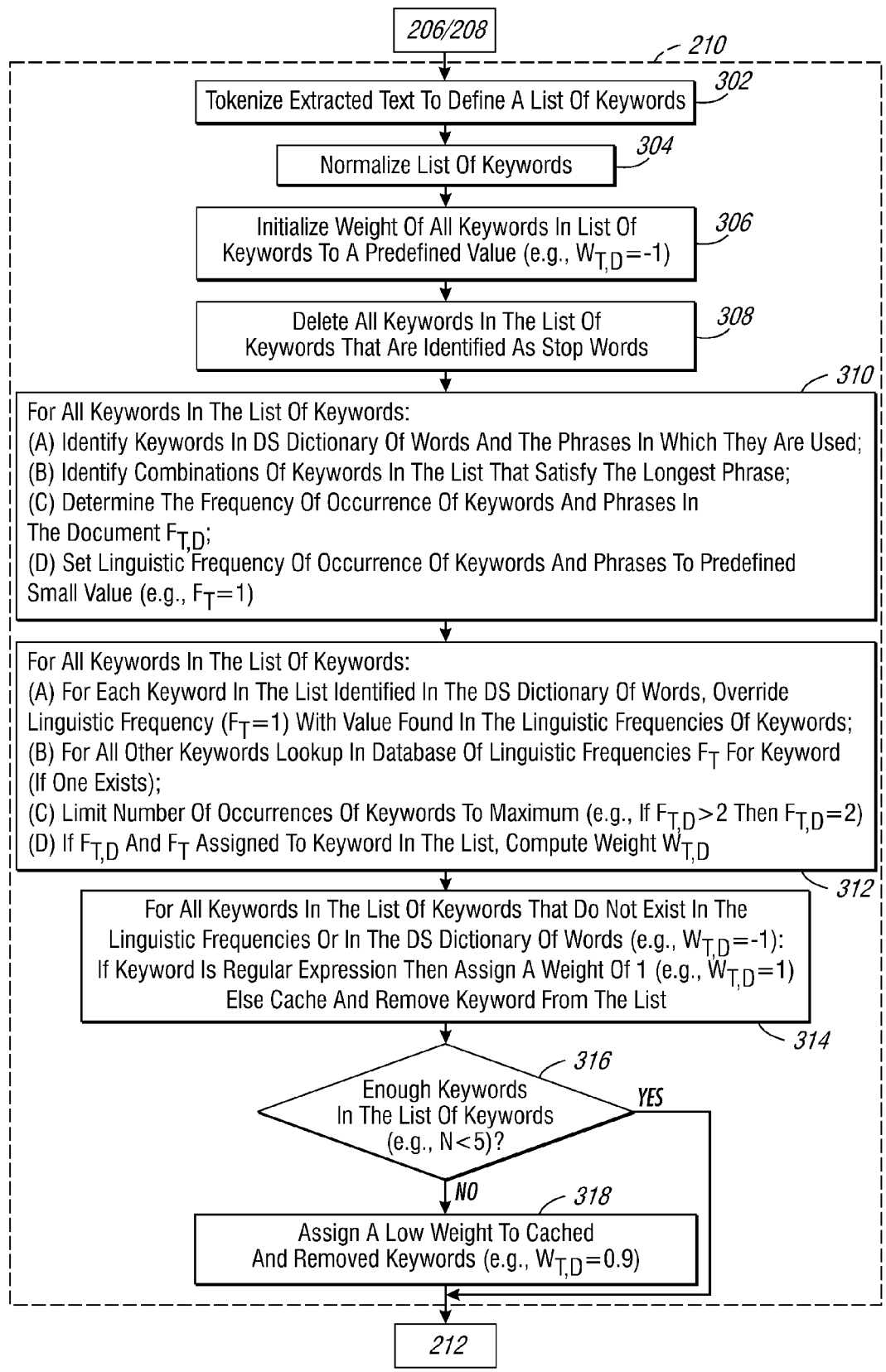
FIG. 3 is a flow diagram that sets forth details for identifying keywords in tokenized text.

At 210 the text identified in the input document 202 by either the OCR engine 120 and/or the parser 122 is tokenized and the best keywords are identified therein by best keyword identifier 124, the details of which are shown in FIG. 3 and described below in section B. In one embodiment, a keyword translator 126 translates the keywords before providing them to search module and result analyzer 128, thereby expanding the results received to include languages to which the keywords were translated, and thereby allowing for the identification of translations of equivalent search results. (If multiple translations are identified, they can be ranked by the value of their distance measurement calculation relative to the input document.) Using the keyword translator 126, the system is adapted to locate documents relating to the input document in the language of the input document or a different language, which different language(s) may be specified by a user.

At 212 a query is developed by search module and results analyzer 128 using the best keywords identified at 210 and a search is conducted to identify similar documents using the developed query. In conducting a search, the search module 128 accesses, in one embodiment, information sources 146 that include: personal disks 112 of user computers that have WebDav compliant repositories, one or more online databases 114, and/or one or more search engines 116.

In addition at 212, the results of the search are stored in document store 130 by search module 128 and analyzed by results analyzer 128. In the event the results do not prove sufficient in number and/or quality for the type results desired, the acts of developing a query using the best keywords and carrying out the search are repeated until the results prove sufficient or the search is terminated. Details of the acts performed at 212 is set forth in FIG. 4 and described below in section C.

At 214, if the results are insufficient, while including previous results obtained if act 218 is performed, then acts 216 and 220 are skipped and a message indicating insufficient results were identified is delivered at 222 as the search results. In the event results are insufficient, the user has the option to refine and restart the search by adjusting user-settable parameters of the search request.

Generally, search results have computed similarity with the input document as discussed in detail below with reference to FIGS. 5, 6, and 7. In one embodiment, the similarity value "S" is used to classify search result documents as either a "match" of the input document ($S \geq 95\%$), a "revision" of the input document ($90\% \leq S < 95\%$), or a document that is "related" to the input document ($Q < S < 90\%$), where "Q" is a user-settable "quality" parameter of the search request. In one embodiment, the values of Q are equal to 70%, 50%, and 30%, corresponding to minimum "quality" parameters settings of high, medium, and low, respectively.

The general measure of quality of search results has two components: precision and recall. Search results have good precision when the document being searched for is identified. Search results have good recall when not only the document being search for is identified but also all copies of the document being search for are identified.

In evaluating search results for input documents that were OCRed (or more generally has bitmap image data that has been analyzed to identify textual content) or known to be a partial document, then the search results tend to have good precision but poor recall. When this occurs, the act 216 is performed using the identified search result to increase the recall of the search results. (Note that the system advances to 220 from 216 when it has already performed 216 and 218 a predetermined number of times (e.g., once).) Accordingly at 216, if the input document 202 is OCRed or if the input document is known to be a partial document (e.g., an input document that is specified with a "partial document" user-settable parameter), and the search results have provided a match with few if any additional documents (e.g., revised, or related), then act 218 is performed; otherwise, act 220 is performed. At 218, the document determined to be a match (e.g., with the highest similarity value S) is processed as the input document at 208, 210, and 212 to identify additional documents (i.e., to increase the recall of the original search results).

At 220, if search results identified are sufficient, then the service manager 132 performs user specified services selected from the set of services 136 by for example summarizing the search results at 216 using summarizer 138. Other user specified services that may be applied to search results include translation performed by translator 144. In addition, the service manager 132 can use similar document locator 142 to augment search results that have Web addresses with similar document locator services at search engine 116 and/or augment the search results by identifying their popularity on Web using the search engine 116.

In addition at 220, the summary and token representation of search results along with results of document services performed that are related thereto are delivered to a specified output device 110. The results are provided in a form that allows a user to review the search results and perform desired functions therewith such as editing or printing an original electronic document of a hardcopy input document using device 104.

Further at 220, the service manager 132 may access the digital rights manager 140 to communicate with copyright clearinghouse 118 to purchase a document token that can be exchanged for a rights limited document (e.g., printable, editable, and/or viewable) (e.g., digital rights may be specified using the ContentGuard® digital rights language XrML). Digital rights management is more fully described in the following U.S. Patent Nos., which are incorporated herein by reference: U.S. Pat. Nos. 6,236,971; 5,715,403; 5,638,443; 5,634,012; 5,629,980. In an alternate embodiment, third parties may register electronic content with the copyright clearinghouse 118 and the electronic search system 100 may thereafter provide a warning to the third parties when copies of registered documents have been identified. In one embodiment, a user is charged for any use of copyrighted work performed by the user (e.g., printing, viewing, copying, etc.) and permitted by the copyright clearinghouse 118.

In one embodiment, the output at 222 is a list of search results serialized in XML that contains for each document found: its location on a network (if any, e.g., URL on the Web), original representation (as found before processing), unformatted representation (e.g., ASCII), service results (e.g., summary, converted format, translation, enrichment), metadata (e.g., title, author, etc.), distance measurement (i.e., distance between it and the input document), type of document found (e.g., match, revision, related) according to desired quality, error status (e.g., problems occurred in retrieving the document, search timed out, insufficient access at specified repositories, etc.). The results may be delivered to any number of output devices or mediums such as a user interface or as email or as hardcopy by forwarding the results to a printer, an archive, or a fax machine.

B. Keyword Identification

FIG. 3 is a flow diagram that sets forth details for identifying a set of keywords in tokenized text carried out at act 210 in FIG. 2. The overall strategy followed in generating a final list of keywords involves identifying rare or uncommon keywords (and phrases), which include keywords that belong to one or more domain specific (DS) or subject matter specific dictionaries. The one or more DS dictionaries set forth keywords that exist in a particular subject or class of information (e.g., science, biology, math, music, movies, nature, food, drinks, animals, dogs, company names, country names, religion, etc.). (To benefit from a performance increase it is desirable to merge multiple DS dictionaries having a search complexity of (p)log(n) into a single DS dictionary with a search complexity of log(pn), where "p" is the number of DS dictionaries and "n" is the total number of keywords in the dictionaries.) A high weight is given to these rare keywords that have little or no recorded linguistic frequency as described below. The "weight" of a keyword is used herein to specify one form of many in which a keyword may be valued or rated.

Initially at 302, a sequence of input text received either from OCR engine 120 and/or parser 122 is tokenized at word boundaries while maintaining the order of the sequence of input text by best keyword identifier 124 to define a list of keywords. The keywords in the list of keywords may be delimited by any number of different standard linguistic delimiters (e.g., tab, space, etc.).

At 304, the ordered list of word tokens is normalized by matching unknown forms of word tokens with known forms of word tokens. For example, normalization can include the removal of special characters appended to word tokens (e.g., ?, !, (,), etc.), malformed words (e.g., missing accent, misplaced characters), and error characters generated by the OCR engine in word tokens. Generally, normalizing the ordered list of word tokens transforms them to a form that can be found if they were looked up in a DS dictionary. In another embodiment at 304, the keywords are eliminated that are syntactically equivalent (e.g., words that only differ by case).

At 306, the normalized ordered list of keyword tokens is associated with a weight that is initialized to a predefined value indicative of little or no value. In one embodiment, the predefined value is minus one (e.g., W=−1). Subsequently at 308, all stop words are removed from the normalized ordered list of keyword tokens. The acts performed at 310, 312, and 314 to assign weights (or more generally a rating) to the keywords are described below.

First at 310, for each keyword remaining in the ordered list of keywords, the acts (A)-(D) are performed. At 310(A), an attempt is made to identify the keyword in one or more DS dictionaries of words and phrases in which they are used. In addition at 310(B), combinations of keywords in the list of keywords that satisfy the longest phrase are identified (e.g., the keyword "Corporation" preceded by the keyword "Xerox" will be replaced by the single keyword "Xerox Corporation".) Further at 310(C), the frequency of occurrence $F_{t,d}$ in the input document of the identified keywords and phrases identified in DS dictionaries is determined. Finally at 310(D), the linguistic frequency of occurrence of the identified keywords and phrases is set to a predefined small value (e.g., $F_T=1$).

In one embodiment, the linguistic frequency of occurrence is identified using computed Web frequencies. The computed web frequency for a term and/or phrase may be obtained, for example, by querying a search engine and identifying how many times the word appears in the number of Web pages searched by the search engine.

The dictionaries used to carry out act 310 are domain or subject-matter specific (i.e., "DS dictionaries"). The keywords and/or phrases identified in DS dictionaries are used to focus the results of search queries on keywords that have special importance. Identifying keywords from DS dictionaries ensures that search results contain portions of the input document. In addition, keywords and/or phrases identified in DS dictionaries allow search results of similar documents to focus on documents in the field of interest.

In one embodiment, the DS dictionaries include subject-matter dictionaries that identify common words of a subject or class of subjects such as: subject-matter domains, company names, and people names. Subject domains include names such as "science", "biology", "computers", etc. In one embodiment, the DS dictionaries of company names and people names include those most famous names. In addition, DS dictionaries may include classes of formatting such as revision formatting that includes revision entries such as "1.1.3", "I.a.2", etc.

At 312, for each keyword remaining in the ordered list of keywords, the acts (A)-(D) are performed. At 312(A), for each identified keyword (and phrase) identified in DS dictionaries at 310(A)-(B), the default linguistic frequency (e.g., $F_T=1$) is overridden with the value found, if any, in the database of linguistic frequencies of keywords. This is done to lower the importance of keywords identified in a DS dictionary that also have a linguistic frequency of occurrence.

At 312(B), for each other keyword in the list of keywords which has no corresponding identified DS dictionary keyword or phrase, a linguistic frequency is assigned to it from the database of linguistic frequencies, if one exists. As set forth above, a word's linguistic frequency may be specified using its frequency of occurrence on the Web. In one embodiment, a linguistic frequency does not exist for a keyword if it has no "measurable" value in the database of linguistic frequencies (i.e., either, no measured linguistic frequency, or a measured linguistic frequency below a predefined threshold). In an alternate embodiment, a linguistic frequency does not exist if it is not recorded in the database of linguistic frequencies.

At 312(C), the maximum occurrence of a keyword in the input document is set to a predefined limit (e.g., if $F_{t,d}>2$ then $F_{t,d}=2$). The act 312(C) ensures that no single keyword is given an excessive weight (i.e., occurrence minimization). This has the effect of giving less importance to the number of occurrences of a keyword in a document over the fact that the keyword exists in the document. That is, at 312 (C), the system recalculates the weights of keywords that have a high rate of occurrence in the document to ensure that the rare keywords will not overly decrease the similarity value in the event rare keywords are not found in the search results. This is believed to be effective for searching for revisions of input documents.

At 312(D), a term frequency $F_{t,d}$ and a linguistic frequency $F_t$ are assigned to a keyword in the list of keywords from the input document, then a weight $W_{t,d}$ is computed as follows using the following TF/IDF equation:

$$W_{t,d}=F_{t,d}*\log(N/F_t), \text{ where:}$$

$W_{t,d}$: the weight of term t in document d;

$F_{t,d}$: the frequency occurrence of term t in document d (i.e., "keyword frequency");

N: the number of documents in the document collection (i.e., the database of linguistic frequencies of keywords);

$F_t$: the document frequency (i.e., "linguistic frequency") of term t in the document collection.

At 314, domain specific expressions are accounted for by performing the following on all keywords in the list of keywords (i.e., keywords and phrases of keywords) that do not exist in a DS dictionary of words at 310 or have a linguistic frequency at 312 (e.g., all those with the predefined weight $W_{t,d}=-1$ set at 306), by assigning a predefined low weight (e.g., $W_{t,d}=1$) to those keywords that match a predefined set of regular expressions; otherwise, the keyword is removed from the list of keywords and cached in memory. Regular expressions in the set of regular expressions are used, for example, to match a linguistic expression (e.g., "geno") that may be appended to a word or scientific expressions (e.g., "H$_2$O").

At 316, a determination is made as to whether a sufficient number of keywords remain in the list of keywords of the input document. In one embodiment, a quantity of five keywords is sufficient to continue and develop a query at 212. Otherwise at 318 if there exists an insufficient number of keywords identified, a predefined low weight (e.g., $W_{t,d}$=0.9) is assigned to cached keywords that were removed from the list at 314 and the act 212 is subsequently performed. That is, before continuing at 316 and 318, the system is adapted ensure that the list of keywords includes at least a critical minimum number of keywords by supplementing it with keywords previously filtered out.

C. Query Formulation

Figure 4:
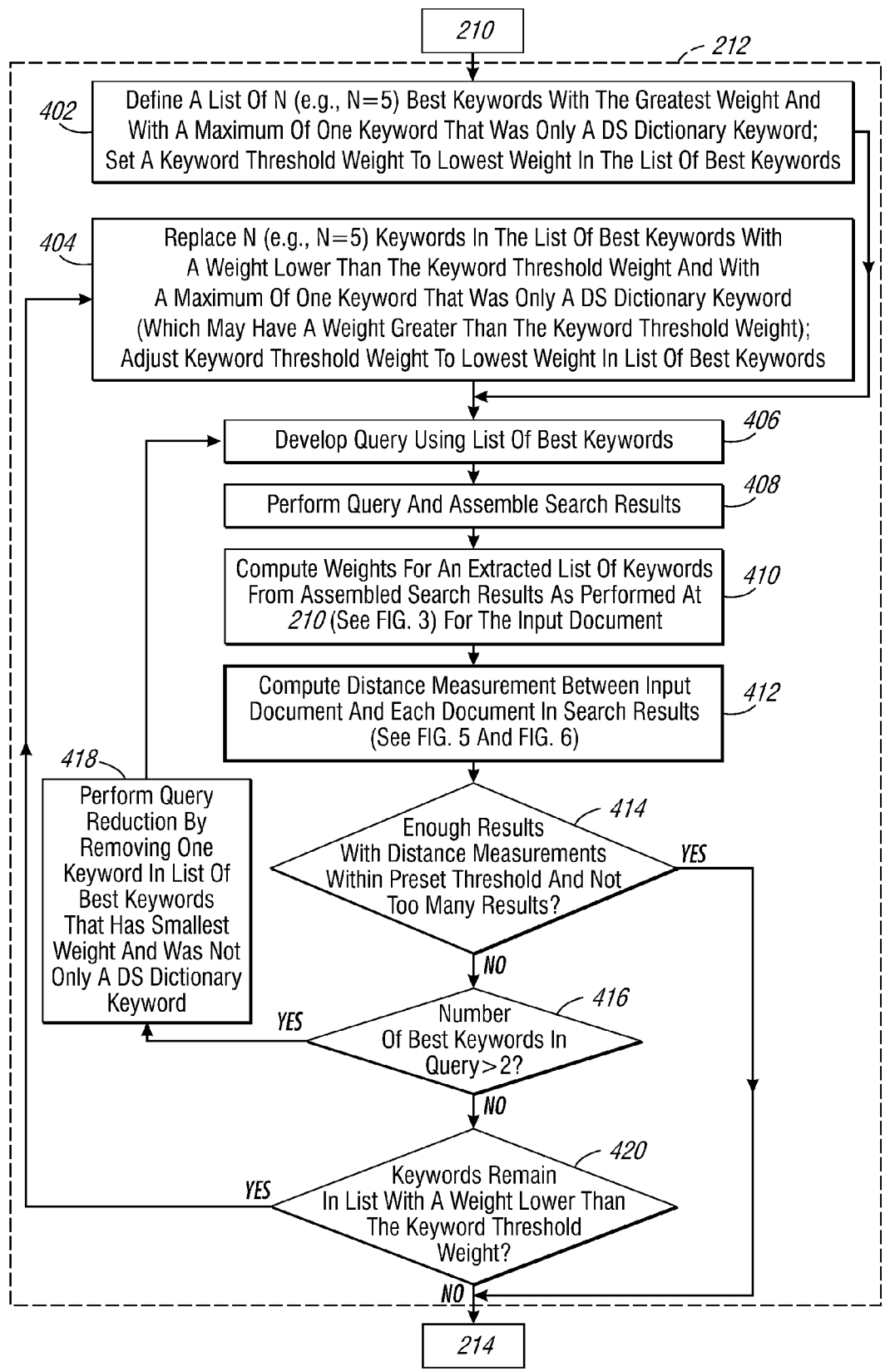
FIG. 4 is a flow diagram that sets forth details for performing a query using the a list of best keywords.

FIG. 4 is a flow diagram that sets forth details for performing a query at 212 in FIG. 2 using a list of best keywords (i.e., those having the greatest weight, or more generally having the highest rating). The list of best keywords is generated by limiting the number of total keywords in a query and the number of those keywords that also appear in a DS dictionary. The keywords with the greatest weight are the keywords that identify the rarer keywords. The overall strategy is to develop a query which returns a manageable number of results.

If an insufficient number of search results are returned using the list of best keywords, the list of best keywords is reduced by performing query reduction, and if after query reduction an insufficient number of results are identified then the list of best keywords is replaced by a new list of best keywords. Query reduction involves reducing the number of keywords in a query while keeping the rarest keywords. When replacing the best list of keywords, a threshold, which corresponds to the maximum weight that keywords may have in any new list, is defined to avoid identifying the same best keywords when the new list of keywords is developed.

Initially at 402, the list of best keywords is defined by selecting a predefined maximum number of keywords (e.g., N=5) in the list of keywords of the input document with the greatest weight. In one embodiment, the keywords forming part of the list of best keywords may have a maximum of one keyword that is identified as belonging only to a DS dictionary. Keywords that are "only in a DS dictionary keywords" are keywords that are: (i) identified as belonging to a DS dictionary at act 310(A) and (ii) have no measurable linguistic frequency at act 312(B), which acts are shown in FIG. 3. In another embodiment, the maximum number of keywords identified as belonging only to a DS dictionary is a number less than the predefined maximum number of keywords (e.g., N≦5). Limiting the keywords that only belong to a DS dictionary ensures that the search remains focused but does not become overly specific since keywords that belong only to a DS dictionary tend to be uncommon keywords. Finally at 402, a keyword threshold weight is assigned a value equal to the weight of the keyword in the list of best keywords with the lowest weight.

At 406, a query is developed by formulating wrappers using the list of best keywords. The system is adapted to receive wrappers or adapters to enable personalization of searches. An adapter is used to directly access and/or query an information sources through its API (Application Program Interface). Wrappers in general specify the interaction of the system with information sources. More specifically, wrappers, which can control data flow from the information sources, specify the appropriate protocol, format, and syntax (e.g., available operators, access rights) for querying a selected information source. More information concerning the creation of wrappers for querying information sources is disclosed in U.S. patent application Ser. Nos. 09/361,496 and 10/277,662, which are incorporated herein by reference.

At 408, the query is performed using the wrappers developed at 406 and search results from the query are assembled. The query may be performed at and results received from either system default or user identified information sources 146 that include repositories or search facilities, such as, the personal disks 112, online database 114, or the search engine 116 shown in FIG. 1.

In one embodiment at 408, wrappers are loaded depending on a user specified list of wrappers in a user profile. A process manages the initiation of queries using the wrappers to effectively query information sources in parallel. Another process collects results returned in response to the different queries made to the various information sources. If an information source does not answer within a system default period of time or user defined period of time, the query to that information source is terminated.

At 410, keyword extraction is performed using the method detailed at 210 in FIG. 3 and performed for identifying the keywords of the input document. The keyword extraction performed at 410 results in a list of keywords with associated weights. At 412, a distance measurement is computed between the input document and each document in the search results using their list of keywords, the details of which are discussed below in section D with reference to FIGS. 5 and 6.

At 414, if there exists sufficient results with distance measurements that fall within a preset threshold value and not too many results exist, then act 214 is performed in FIG. 2. However, if the results are excessive (i.e., over a predefined limit) or are insufficient (i.e., under a predefined number) that have distance measurements within the preset threshold value, then act 416 is performed; otherwise, act 418 is performed.

At 416, if there exists more than 2 keywords in the query then keyword reduction is performed at 418. Once keyword reduction is performed then the act of developing a query is repeated at 406. Keyword reduction performed at 418 consists of removing the keyword in the list of best keywords with the lowest weight that is not a keyword that was identified as belonging only to a DS dictionary at 402. This ensures that the search remains focused but is broadened by removing keywords from the list of best keywords used to formulate a query.

In one embodiment in which the total number of keywords "N" that are in the list of best keywords is five, query reduction is performed at 418 in this embodiment a maximum of two times (i.e., no less than three keywords may define a query). For example, assume the search began with the five keywords [A,B,C,D,E], where keyword A is a DS dictionary keyword and has no measurable linguistic frequency (i.e., belongs only to a DS dictionary) and the weights of the keywords is ordered from greatest to smallest as follows: C, E, B, D. Performing query reduction in this embodiment results in producing the following two additional lists of keywords:[A,B,C,E][A,C,E]. It is important to note that the order of the keywords as they appear in the document is maintained not only in the list of keywords but also in the list of best keywords.

At 420, if keywords in the list of keywords remain with a weight less than the keyword threshold weight then act 404 is performed to specify a new list of best keywords that is subsequently processed at 406; otherwise, act 214 is performed in FIG. 2. At 404, the list of best keywords is replaced with another list of best keywords defined using the list of keywords with keywords from the list that have less than the keyword threshold weight. In one embodiment, notwithstanding keywords remaining in the list of keywords at 420, the search is terminated in the event the list of best keywords has been replaced a maximum number of ten times at 404.

In addition at 404 as at 402, only one keyword that makes up the list of best keywords may be one that was identified as belonging only to a DS dictionary (i.e., it belongs only to a DS dictionary at 310(A) and has no measurable linguistic frequency at 312(B) in FIG. 3). Given this restriction, there exists the possibility that the one keyword that belongs only to a DS dictionary has not formed part of a list of best keywords and may have a weight greater than the keyword threshold weight because it was skipped when the threshold of one DS dictionary keyword was exceeded. In the event this should occur, the DS dictionary keyword with the greater weight is included in the list of best keyword.

D. Distance Measurement

FIGS. 5 and 6 sets forth pseudo code depicting computational operations of a method for calculating the similarity or the distance between two documents that are carried out generally at 412 in FIG. 4. In addition, reference is made in FIG. 6 to FIG. 7, which sets forth pseudo code for computing the ordered sum of keywords forming part of two documents.

Initially at 502 and 504 in FIG. 5, sums are computed for various keyword weights of the input document "D1" and document "D2" from the search results assembled at 408 in FIG. 4. The various sums of keyword weights computed include a unique attributes sum (i.e., sum of weights of keywords that appear in one document but not in another), a total sum (sum of weights of keywords that appear in a document), and a shared sum (sum of weights of keywords that appear in one document that also appear in the other document).

At 506, if the input document originates from a hardcopy document, then a tolerance ratio "T" is computed using certain of the sums computed at 502. The tolerance ratio is dependent on a constant "K" that defines the OCR error rate at the keyword level. If no OCR errors are detected or the OCR error rate is set to zero then the constant "K" is set to zero. The tolerance ratio T is defined as: T=K*(total sum−shared sum)/total sum.

At 508, the inclusion ratio "I", which represents the percentage of keyword weights in the input document that are in the document search results plus the tolerance ration T (as opposed to ratio "R" which is based on the number of keywords in the input document), is computed. The inclusion ratio "I" specifies one factor in the distance measurement. That is, an input document is considered an "inclusion" of search results if the input document is determined to be included in the search results (e.g., the input document is one page of a ten page search result document).

At 510 in FIG. 6, through regression analysis performed on search results, an inclusion ratio with a value greater than ninety percent provides a good indication that the document D1 from the search results is matches all or part of the input document D1; otherwise, if no inclusion is detected then operations at 512 are performed.

In the event an inclusion is detected (e.g., I>90%) at 510, the assessment of inclusion is refined by comparing the neighbors of each keyword in the input document and the search results. Generally, the neighbors of each keyword are extracted from the original document and from the search results. These neighbors are then compared and if there is a good match between the neighbors as a whole (e.g., 80%), then the initial determination of an inclusion is verified.

More specifically, the inclusion verification is done by computing an ordered inclusion ratio "I2" that is a function of an ordered sum of the weights of the keywords. That is, the inclusion ratio "I2" defines what percentage of keyword weights along with a set of their neighboring keyword weights in the input document also exist in the search results document. The initial determination of an inclusion is not conclusive because the inclusion ratio "I" does not take into account the weights of the keywords coming from D1 as the inclusion ratio "I" is defined as the percentage defined by ratio of Sum3/Sum2, where:

D1 is the number of keywords in the list of keywords for document D1;
D1 is the number of keywords in the list of keywords for document D2;
Sum 3 is the sum of the weights of keywords that appear in D1 that also appear in D2;
Sum 2 is the sum of the weights of keywords in D1.

To compute the ordered inclusion ratio "I2", the ordered sum of D1 and D1 is computed, which is the sum of the weights of keywords in D1 with the same neighbors in D2. The details of one embodiment for computing an ordered sum using two lists of keywords are set forth in FIG. 7.

The strategy for computing an ordered sum shown in FIG. 7 is directed at making sure the distance computation of two documents being compared that is already believed to be very close is not decreased unless there is a clear indication the documents are less similar than the initial distance computation indicates. Accordingly, when a determination of a keyword and its neighbors cannot be accurately made at 602 or a non-existing match of a keyword is identified at 604, weights corresponding to these keywords are added to the ordered sum. However, only those keyword weights (i.e., "terms t") that satisfy a predetermined percentage of common neighbors (e.g., 80%-T, where "T" is a minimum percentage that accounts for OCR error at the word level) at 606 are added to the ordered sum.

Referring again to 510 in FIG. 6, if the ordered inclusion ratio I2 is found to be greater than the inclusion ratio I, then the similarity S is set to equal the inclusion ratio I because the inclusion ration I indicates that document D1 forms part of D1 (e.g., D1 is a one page document and D2 is a ten page document which includes the page from D1). Otherwise, if the input document D1 originates from a hardcopy document and the ordered inclusion ratio is greater than fifty percent and the ratio R (number of keywords in D1 not in D2/number of keywords in D1) is less than twenty percent, then the similarity S is set to equal the inclusion ratio I; otherwise, it is set to equal the ordered inclusion ratio I2.

At 512, the Jaccard similarity distance measure is computed for the list of keywords D1 and D2. Through regression analysis of search results it has been determined that if the Jaccard similarity measure is greater than approximately ninety percent then it is likely that the document being evaluated is a revision of the input document; otherwise, it is believed that the document being evaluated may be a document similar to the input document at which point the Jaccard similarity is returned as the measure of similarity S between keyword lists D1 and D2.

In one embodiment, if at 512, the jaccard similarity is computed to be greater than approximately ninety percent then the ordered sum is computed using the same mechanism described for 510 set forth in FIG. 7, except that the sum of the weights of keywords from D1 with the same neighbors in D1 is computed. Subsequently, an ordered similarity is computed using the ordered sum. The value of the ordered similarity, instead of the computed Jaccard similarity, is used as the measure of similarity between the search result document D1 for which a similarity is being computed except for when: the input document originates from a hardcopy document, the ordered similarity is greater than approximately fifty percent, and the ratio R (i.e., the number of keywords in D1 not in D2/the number of keywords in D1) is not greater than approximately twenty percent.

E. Specific Operating Environment

Figure 8:
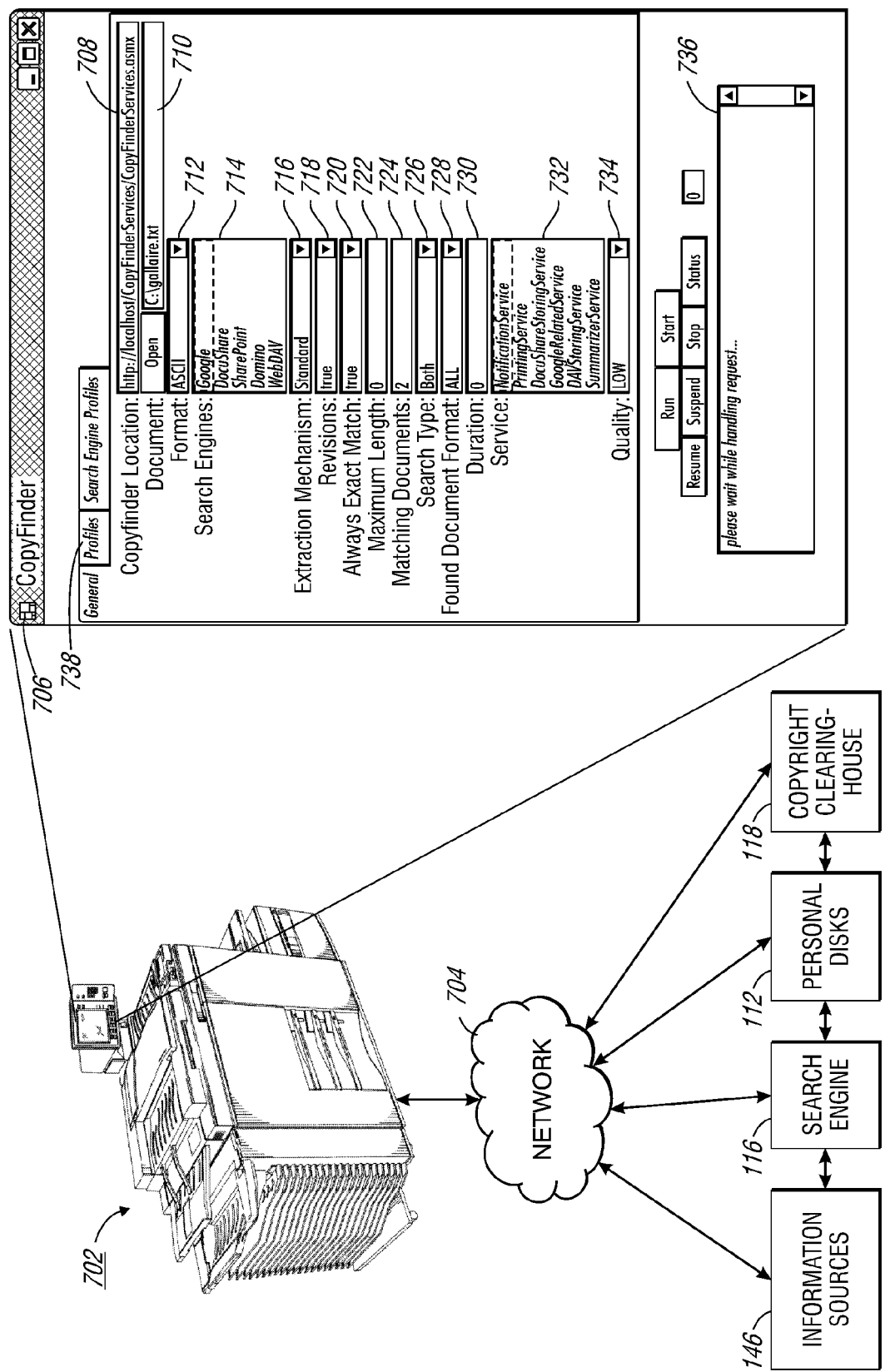
FIG. 8 illustrates one particular embodiment for carrying out the present invention.

FIG. 8 illustrates one particular embodiment for carrying out the present invention in which the input device 102 (e.g., though either a scanner or via a network connection 704), electronic search system 108, and output device 110 (e.g., a printer) form part of an reprographics system 702 which communicates directly (or indirectly) with copyright clearinghouse 118 and information sources 146 that include databases, search engines, and personal disks. In one embodiment, the electronic search system 108 that forms part of the reprographics system 702 is accessed using "Copy Finder" interface 706. Once parameters are specified through the interface 706 by a user, the search is run and results are displayed at 736, or alternatively, printed, faxed, stored, and/or emailed to destinations specified by the user. Advantageously, original electronic documents of hardcopy documents scanned in at the reprographics system 702 may be identified and printed in lieu of reproducing the hardcopy document (of lesser quality).

The Copy Finder interface 706 allows a user to specify multiple parameters (or user settable parameters) or alternatively rely on their default values defined by the reprographics system 702. The Copy Finder interface 706 provides for the specification at 708 of the location of the electronic search system 108. This permits the electronic search system 108 to operate locally at the reprographics system 702 or at a remote location located on network 704. The document parameter 710 provides for the specification of the name of the input document 202, which may be automatically detected by the document reproduction machine 700 as the current document being scanned or received over network 704.

The format parameter 712 provides for the specification of the desired format of the document that is given as input, which in one embodiment includes one of the formats Image, Word, Excel, PowerPoint, PDF, ASCII, and HTML. The search engine parameter 714 provides for the specification of various information sources 144 that include: search engines, proprietary databases, and local disk drives. The extraction mechanism parameter 716 provides for the specification of either standard or linguistic extraction. Standard extraction does not include morphological analysis and part-of-speech disambiguation when extracting text from an input document, as does linguistic extraction.

The revisions parameter 718, if specified to be true, provides that revisions of the input document should be identified and returned in the results. If the always-exact-match parameter 720 is set to true a document or documents are returned that are identified as the closest match to the input document even if the matching document(s) does not satisfy the exact match criteria. The maximum length parameter 722 provides for the specification of the maximum length of documents forming part of the search results (a value of zero indicates no limit). The matching documents parameter 724 provides for the specification of the maximum number of documents to return in the search results.

The search type parameter 726 allows a user to specify either exact match (i.e., only exact match documents that are identified in search results are returned), related (i.e., only related documents are searched and returned), or both exact match and related. The found document format parameter 728 specifies the format of documents to be searched and identified by the system (e.g., Word, Excel, PowerPoint, PDF, ASCII, HTML, or any). The duration parameter 730 provides for the specification of the maximum time period the search should continue before terminating automatically (a value of zero indicates no limit). The services parameter 732 provides for the specification of services to be performed by the service manager 132 from the set of services 136. The services include printing, archiving, faxing, emailing, summarizing, enriching, viewing, and recommending. The quality parameter 734 provides for the specification of the quality of the similar documents identified as being "related" to the input document as high or matching, medium or revisions, low or related.

Under profiles 738, a user may specify a target language. If the target language is set to the same as the language of the input document then the system is adapted to locate documents matching only that language (e.g., keyword translator 126 shown in FIG. 1 is skipped). In addition, under the user profiles 738, a user may specify a special field of interest that identifies specific subject-matter dictionaries that are used to identify keywords and/or phrase in the input document, thereby allowing similar documents that are found to focus on the special field of interest.

F. Applications

F.1 Document Query System

In one application a user may use a reprographics machine as a query interface. At the reprographics machine, queries for similar information are defined using an input document, whether hardcopy or electronic. The reprographics system which has scan, print, email, fax, and email capabilities, is advantageously adapted to provide search results in any desired form and through any desired medium. Embedded with the electronic search system, the reprographics system is advantageously adapted to query identified information sources for information similar to the input document. The search results may be in any desired language specified by the user. Advantageously, the electronic search system permits a user to carry out a search for information similar to an input document without having to know how to formulate a query and without have to know what information sources to access, and if in a foreign language, without having to translate the input document.

F.2 Document Updater

Further input documents may be used to find similar documents, and after finding a similar document a service can be applied that is an update service. The update service updates the similar document that was identified as containing information similar to the input document. In one embodiment, similar documents are located in a corporate database, which partially matches an input document. Once found, the system compares and detects additions and/or modifications made to the input document relative to the similar documents that have been located. Subsequently, the system automatically updates the located documents that most closely match the input document with the additions and/or modifications made to the input document (e.g., such as meeting minutes, comments, etc.).

F.3 Spam Filter

In another application, the electronic search system may be used to filter spam. In this application, a collection of spam documents is stored in a repository on which the electronic search system queries for matching and/or similar input documents. Input documents identified as matches or revisions of a spam documents are filtered from being received by a user and/or identified to a user as likely to be spam (e.g., placed in a bulk mailbox).

F.4 Categorizer

In yet another application, the electronic search system may be used to categorize documents as follows. First, keywords of an input document are identified. Subsequently, the keywords are compared to a category vocabulary. The category vocabulary for a category consists of one or more terms that describe the category. In one embodiment, the category vocabulary is generated a priori and associated with each category in an ontology (e.g., from the DMOZ ontology). After calculating a distance measurement, the closest match is used to identify the category in the ontology, thereby categorizing input documents.

F.5 Language Identification

The electronic search system may be used to automatically identify the language in which an input document is written as follows. First, keywords of an input document are identified. Subsequently, dictionaries of keywords associated with each language are compared to the keyword list of the input document. If no keywords in the keyword list of the input document match keywords in the keyword list associated with a language then the language is eliminated. The closest matching list or lists of keywords (i.e., with the closest distance measurement) identify the language or languages in which textual content in the input document is written.

F.6 Multilingual Documents

The electronic search system is adapted to process multilingual documents. To recapitulate, the systems, methods, and articles of manufacture, described herein take as an input document, a hardcopy document or an electronic document, and is adapted to return a set of documents (including their locations (e.g., URLs), summaries, text content, applied services) that includes documents similar (i.e., matches, revisions, relations) to the input document and also to translated documents. The system searches for similar documents (and translations) in specified information sources. When several documents are returned the system is adapted to identify those search results that match, are revisions of, or are related to the input document.

In operation, the input document is tokenized by the system and the most relevant keywords are extracted according to a pre-defined list of entities, domain specific dictionaries, and regular expressions. The specialized dictionaries include common names of companies, people, and the like. A language guesser is used to detect document source language in all or parts of the input document, thereby processing multi-lingual documents. Advantageously, keywords that would disrupt a query because they are in a different language are identified and removed from the list of keywords. A regular expression mechanism may be used to detect keywords that do not belong to the language of the input document yet are relevant to it.

More specifically, the most relevant keywords that are identified in an input document as not belonging to the language of the input document (or not the primary language of the input document) are translated into the primary language of the input document by taking into account the surface forms and base forms of the keywords. The surface forms of these keywords are identified in the input document and their base forms are then identified and translated. The translated base form of the keyword is added to the list of keywords of the input document. A weight is associated with each keyword translated in the input document according to its relevance. These keywords are processed as described above with reference to FIG. 3 to determine whether they should form part of the list of keywords for the input document.

As set forth above, the system is adapted to identify the best keywords and formulate a query for searching for matches, revisions, and relations of the input document, and if necessary, reformulate the list of best keywords as set forth above. Using the same keyword extraction mechanism used for the input document, keywords are extracted from the search results as set forth above. The extracted keywords from the search results, whether translated or not, are then compared with the keywords extracted from the input document using the distance measurement calculation set forth above.

F.7 Special OCR Error Handling

As set forth above, the electronic search system is adapted to account for the likelihood of OCR errors when identifying text in bitmap documents by setting different tolerances or tolerance ratios (e.g., see 506 in FIGS. 5 and 600 in FIG. 7). In addition, keywords introduced by OCR errors that are not present in the input document may be filtered and removed by calculating the probability of each keyword using the category of the preceding keyword's part of speech. If the keyword is not expected, it is removed from the list of keywords.

F.8 Electronic Document Archival

The electronic search system 108 shown in FIG. 1 may also be used as an electronic information archival management service. Hardcopy and/or electronic documents submitted to the system 108 are processed to identify whether any similar (i.e., matching, revised, or related) documents exist in specified document archive(s), which may include document storage facility 130 and/or other document storage facilities remote from the system 108 (e.g., online database 114).

The system 108 determines whether to add and/or remove documents from/to the specified document archive(s) depending on whether an input document (i.e., a document sought to be archived): (a) matches a document already archived (in which case the system 108 ignores the archive request and returns a result with possible user feedback specifying that the document has already been archived with a pointer to the archived document), (b) is a revised document of an archived document (in which case the system 108 may depending on user preferences or specified criteria keep only the most recent version, keep all versions or a number of predefined versions, or keep the newest and oldest versions, etc.), (c) is related to an archived document (in which case links may be drawn between the two), or (d) no similarity is found (in which case the input document is archived).

Advantageously such an archival system is adapted to reduce archiving duplicate documents, whether it is archived using a scanned representation of a hardcopy or a document that was generated electronically. Also, pre-processing of documents before archival using the system 108 provides increased performance during document retrieval since the system 108 attempts to maintain a minimum set of archived documents (i.e., thereby minimizing the total number of documents searched. In addition, archived documents that are revisions and/or related to other archived documents may be linked in advance using the system 108 to improve document retrieval. Further such a system may be advantageously used to merge multiple document archives into a single document archives, advantageously minimizing redundant information and linking related information in the multiple document archives.

G. Miscellaneous

It will be appreciated by those skilled in the art that the search results returned for an input document may take any form and need not be the form of a text limited document. Instead, search results may include other forms of information such as images, video, and audio, which may all be reduced to text searchable media using techniques known in the art. Further it will be appreciated by those skilled in the art that the retrieved documents may be used to enrich the input document by either adding elements of the retrieved information (with appropriate attribution) using document references. Also, it will be appreciated by those skilled in the art that the list of keywords identified in accordance with the invention may be used in any number of applications including language identification, indexing, clustering, searching, translating, storing, duplicate detection, and filtering.

It will also be appreciated by those skilled in the art that advantages of systems, methods, and articles of manufacture, described herein include: the ability to locate translations of an input document; finding similar documents in one or more languages; carrying out a query to obtain an answer to a question using a paper interface and a reprographics machine; authoring documents by adding dynamic information with a reprographics machine; automatically updating archived documents using an input document and a reprographics machine; locating a complete document using a part of it as an input document (e.g., in the event other parts of it were damaged or lost); retrieving an original electronic document of a hardcopy input document; locating the latest revisions of an input document; performing a search for similar documents using an input document (hardcopy or electronic); finding the electronic location at which a hardcopy document is stored; finding information to which a hardcopy input document or set of hardcopy input documents relate by identifying exact matches and summarizing those matches; and improving search results with translated keywords.

Using the foregoing specification, the invention may be implemented as a machine (or system), process (or method), or article of manufacture by using standard programming and/or engineering techniques to produce programming software, firmware, hardware, or any combination thereof. For example, the electronic search system 108 may be implemented as a machine that includes a memory for storing therein (i) processing instructions adapted to carry out operations performed by the operating elements 120, 122, 124, 126, 128, 132, 134, 136, and (ii) data recorded in storage 108 or processed by the operating elements (including the input document, search results, and processed search results). In operation, the processor of the machine executes the processing instructions stored in the memory.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A computer implemented method for identifying output documents similar to an input document, comprising:
   (a) receiving the input document that includes textual content;
   (b) performing optical character recognition on the textual content to identify text;
   (c) analyzing the text and the textual content to identify keywords, wherein a predefined number of keywords is identified from a first list of rated keywords extracted from the input document;
   (d) creating a list of best keywords wherein for each keyword remaining in the first list of keywords performing the steps,
      (1) identifying the keyword in one or more domain specific dictionaries of words and phrases in which they are used;
      (2) identifying combinations of keywords in the list of keywords that satisfy the longest phrase;
      (3) determining the frequency of occurrence in the input document of the identified keywords and phrases identified in the one or more domain specific dictionaries;
      (4) setting the linguistic frequency of occurrence of the keywords and phrases to a predefined value; and
   (e) defining a list of best keywords, wherein the list of best keywords has a rating greater than other keywords in the first list of keywords except for keywords belonging to a domain specific dictionary of words and having no measurable linguistic frequency;
   (f) formulating a query using the list of best keywords;

(g) performing the query to assemble a first set of output documents;

(h) identifying lists of keywords for each output document in the first set of documents by tokenizing the keywords at one or more predefined word boundaries while maintaining order of the sequence of the input text and translating the keywords into one or more languages;

(i) computing a measure of similarity between the input document and each output document in the first set of documents; and (j) defining a second set of documents with each document in the first set of documents for which its computed measure of similarity with the input document is greater than a predetermined threshold value; wherein the list of best keywords has a maximum number of keywords less than the number of keywords in the list of best keywords that are identified as belonging to a domain specific dictionary of words and having no measurable linguistic frequency, each document in the second set of documents is identified as being one of a match, a revision, and a relation of the input document, wherein the query is repeated until a predetermined number of results are obtained or the query is terminated;

(k) if the second set of documents includes a matching document but no similar documents repeating (a)-(j) using the matching document to identify similar documents, wherein if one or more documents is related to a copyright registered document, the one or more documents is rights limited; and (l) delivering each document in the second set of documents to one or more predetermined output devices, wherein the collection of documents is set forth in a list serialized in XML that contains for each document found: its location on a network, original representation, unformatted representation, service results, metadata, distance measurement, type of document found according to desired quality, and error status.

2. The method according to claim 1, further comprising:

(m) if the second set of document contains an insufficient number of output documents, performing query reduction by removing at least one keyword in the list of best keywords that is not the keyword that is identified as belonging to a domain specific dictionary and having no measurable linguistic frequency.

3. The method according to claim 2, further comprising if after performing (m) the second set of document contains an insufficient number of output documents, performing:

(n): replacing the list of best keywords using keywords having a rating greater than other keywords in the first list of rated keywords; and repeating (b)-(l).

4. The method according to claim 3, performing (n) when textual content in the input document is identified using OCR or a portion of the input document matches the output document.

5. The method according to claim 1, wherein the predefined number of keywords identified from the first list of rated keywords is five.

6. The method according to claim 1, further comprising:
recording a digital image representation of the input document;
performing OCR on the digital image representation to identify text;
analyzing the text to identify keywords.

7. The method according to claim 1, further comprising:

(o) extracting from the input document the first list of keywords;

(p) determining if each keyword in the first list of keywords exists in a domain specific dictionary of words;

(q) for each keyword in the first list of keywords, determining its frequency of occurrence in the input document, also referred to as its term frequency;

(r) for each keyword identified at (k) that exists in the domain specific dictionary of words, assigning each keyword its linguistic frequency if one exists from a database of linguistic frequencies defined using a collection of documents, and assigning its linguistic frequency to a predefined small value if one does not exist in the database of linguistic frequencies;

(s) for each keyword that was not identified in the domain specific dictionary of words at (h), assigning each keyword its linguistic frequency if one exists in the database of linguistic frequencies; and (t) for each keyword in the first list of keywords to which a term frequency and a linguistic frequency are assigned, computing a rating corresponding to its importance in the input document that is a function of its frequency of occurrence in the input document and its frequency of occurrence in the collection of documents.

8. The method according to claim 7, for each keyword that was not identified in the domain specific dictionary of words at (p) and that was not assigned at (r) a linguistic frequency from the database of linguistic frequencies, assigning each that matches a regular expression from a set of regular expressions a predefined rating.

9. The method according to claim 8, further comprising, for each keyword in the first list of keywords, modifying the term frequency of keywords determined at (q) to a predefined maximum.

10. The method according to claim 9, wherein keywords include phrases of keywords.

11. The method according to claim 8, wherein the rating is a weight computed using the following equation:

$$W_{t,d}=F_{t,d}*\log(N/F_t),$$

where:
$W_{t,d}$: the weight of term t in document d;
$F_{t,d}$: the frequency occurrence of term t in document d;
N: the number of documents in the collection of documents;
$F_t$: the document linguistic frequency of term t in the collection of documents.

12. The method according to claim 8, wherein keywords that do not match a regular expression from the set of regular expressions are removed from the first list of keywords.

13. A computer implemented method for computing ratings of keywords extracted from an input document, comprising:

(a) determining if each keyword in the list of keywords exists in a domain specific dictionary of words by tokenizing the keywords at one or more predefined word boundaries while maintaining order of the sequence of the input text and translating the keywords into one or more languages;

(b) determining a frequency of occurrence in the input document for each keyword in the list of keywords, also referred to as its term frequency;

(c) for each keyword identified at (a) that exists in the domain specific dictionary of words, assigning each keyword its linguistic frequency if one exists from a database of linguistic frequencies defined using a collection of documents, and assigning its linguistic frequency to a predefined small value if one does not exist in the database of linguistic frequencies;

(d) for each keyword that was not identified in the domain specific dictionary of words at (a), assigning each keyword its linguistic frequency if one exists in the database of linguistic frequencies; and (e) for each keyword in the list of keywords to which a term frequency and a linguistic frequency are assigned, computing a rating corresponding to its importance in the input document that is a function of its frequency of occurrence in the input document and its frequency of occurrence in the collection of documents, wherein a query reduction is performed by removing at least one keyword in the list of best keywords that is identified as belonging to a domain specific dictionary and having no measurable linguistic frequency if an insufficient number of results are obtained from the list of keywords, wherein the query is repeated until a predetermined number of results are obtained or the query is terminated;

(f) defining a list of best keywords wherein the list of best keywords have a rating greater than other keywords in the list of keywords except for keywords belonging to a domain specific dictionary of words and having no measurable linguistic frequency by tokenizing the keywords at one or more predefined word boundaries while maintaining order of the sequence of the input text and translating the keywords into one or more languages;

(g) formulating a guery using the list of best keywords;

(h) performing the guery to assemble a first set of output documents;

(i) identifying lists of keywords for each output document in the first set of documents;

(j) computing a measure of similarity between the input document and each output document in the first set of documents;

(k) defining a second set of documents with each document in the first set of documents for which its computed measure of similarity with the input document is greater than a predetermined threshold value; wherein the list of best keywords has a maximum number of keywords less than the number of keywords in the list of best keywords that are identified as belonging to a domain specific dictionary of words and having no measurable linguistic frequency, each document in the second set of documents is identified as being one of a match, a revision, and a relation of the input document; and (l) delivering each document in the collection of documents to a predetermined output device, wherein the collection of documents is set forth in a list serialized in XML that contains for each document found: its location on a network, original representation, unformatted representation, service results, metadata, distance measurement, type of document found according to desired quality, and error status.

14. The method according to claim 13, wherein the keywords in the list of keywords are used to carry out one of language identification, indexing, categorization, clustering, searching, translating, storing, duplicate detection, and filtering.

15. A computer implemented system for identifying output documents similar to an input document, comprising: a memory for storing the output documents and the input document and processing instructions of the system; and a processor coupled to the memory for executing the processing instructions of the system; the processor in executing the processing instructions:

(a) identifying a predefined number of keywords from a first list of rated keywords extracted from the input document;

(b) creating a list of best keywords wherein for each keyword remaining in the first list of keywords performing the steps, (1) identifying the keyword in one or more domain specific dictionaries of words and phrases in which they are used;

(2) identifying combinations of keywords in the list of keywords that satisfy the longest phrase;

(3) determining the frequency of occurrence in the input document of the identified keywords and phrases identified in the one or more domain specific dictionaries;

(4) setting the linguistic frequency of occurrence of the keywords and phrases to a predefined value; and (c) defining a list of best keywords wherein the list of best keywords have a rating greater than other keywords in the first list of keywords except for keywords belonging to a domain specific dictionary of words and having no measurable linguistic frequency by tokenizing the keywords at one or more predefined word boundaries while maintaining order of the sequence of the input text and translating the keywords into one or more languages;

(d) formulating a query using the list of best keywords;

(e) performing the query to assemble a first set of output documents;

(f) identifying lists of keywords for each output document in the first set of documents;

(g) computing a measure of similarity between the input document and each output document in the first set of documents;

(h) defining a second set of documents with each document in the first set of documents for which its computed measure of similarity with the input document is greater than a predetermined threshold value; wherein the list of best keywords has a maximum number of keywords less than the number of keywords in the list of best keywords that are identified as belonging to a domain specific dictionary of words and having no measurable linguistic frequency; and (i) if the second set of document contains an insufficient number of output documents, performing query reduction by removing at least one keyword in the list of best keywords that is not the keyword that is identified as belonging to a domain specific dictionary and having no measurable linguistic frequency, wherein the query is repeated until a predetermined number of results are obtained or the query is terminated;

(j) if the second set of documents includes a matching document but no similar documents repeating (a)-(i) using the matching document to identify similar documents; and (k) delivering each document in the second set of documents to a predetermined output device, wherein the collection of documents is set forth in a list serialized in XML that contains for each document found: its location on a network, original representation, unformatted representation, service results, metadata, distance measurement, type of document found according to desired quality, and error status.

16. The system according to claim 15, wherein the processor in executing the processing instructions further comprises:

(l) extracting from the input document the first list of keywords;
(m) determining if each keyword in the first list of keywords exists in a domain specific dictionary of words;
(n) for each keyword in the first list of keywords, means for determining its frequency of occurrence in the input document, also referred to as its term frequency;
(o) for each keyword identified at (m) that exists in the domain specific dictionary of words, means for assigning each keyword its linguistic frequency if one exists from a database of linguistic frequencies defined using a collection of documents, and assigning its linguistic frequency to a predefined small value if one does not exist in the database of linguistic frequencies;
(p) for each keyword that was not identified in the domain specific dictionary of words at (l), means for assigning each keyword its linguistic frequency if one exists in the database of linguistic frequencies; and
(q) for each keyword in the first list of keywords to which a term frequency and a linguistic frequency are assigned, means for computing a rating corresponding to its importance in the input document that is a function of its frequency of occurrence in the input document and its frequency of occurrence in the collection of documents.

17. An article of manufacture for identifying output documents similar to an input document, the article of manufacture comprising computer usable storage media including computer readable instructions embedded therein that causes a computer to perform a method, wherein the method comprises:
   (a) identifying a predefined number of keywords from a first list of rated keywords extracted from the input document to define a list of best keywords; the list of best keywords having a rating greater than other keywords in the first list of keywords except for keywords belonging to a domain specific dictionary of words and having no measurable linguistic frequency, wherein the keywords are tokenized at one or more predefined word boundaries while maintaining order of the sequence of the input text and translating the keywords into one or more languages;
   (b) creating a list of best keywords wherein for each keyword remaining in the first list of keywords performing the steps,
      (1) identifying the keyword in one or more domain specific dictionaries of words and phrases in which they are used;
      (2) identifying combinations of keywords in the list of keywords that satisfy the longest phrase;
      (3) determining the frequency of occurrence in the input document of the identified keywords and phrases identified in the one or more domain specific dictionaries;
      (4) setting the linguistic frequency of occurrence of the keywords and phrases to a predefined value; and
   (c) defining a list of best keywords wherein the list of best keywords have a rating greater than other keywords in the first list of keywords except for keywords belonging to a domain specific dictionary of words and having no measurable linguistic frequency by tokenizing the keywords at one or more predefined word boundaries while maintaining order of the sequence of the input text and translating the keywords into one or more languages;
   (d) formulating a query using the list of best keywords;
   (e) performing the query to assemble a first set of output documents;
   (f) identifying lists of keywords for each output document in the first set of documents;
   (g) computing a measure of similarity between the input document and each output document in the first set of documents;
   (h) defining a second set of documents with each document in the first set of documents for which its computed measure of similarity with the input document is greater than a predetermined threshold value; wherein the list of best keywords has a maximum number of keywords less than the number of keywords in the list of best keywords that are identified as belonging to a domain specific dictionary of words and having no measurable linguistic frequency, each document in the second set of documents is identified as being one of a match, a revision, and a relation of the input document; and
   (i) if the second set of document contains an insufficient number of output documents, performing query reduction by removing at least one keyword in the list of best keywords that is not the keyword that is identified as belonging to a domain specific dictionary and having no measurable linguistic frequency, wherein the query is repeated until a predetermined number of results are obtained or the query is terminated;
   (j) if the second set of documents includes a matching document but no similar documents repeating (a)-(i) using the matching document to identify similar documents; and
   (k) delivering each document in the second set of documents to a predetermined output device, wherein the collection of documents is set forth in a list serialized in XML that contains for each document found: its location on a network, original representation, unformatted representation, service results, metadata, distance measurement, type of document found according to desired quality, and error status.

18. The system according to claim 15, further comprising if after performing (i) the second set of document contains an insufficient number of output documents, performing:
   (l) replacing the list of best keywords using keywords having a rating greater than other keywords in the first list of rated keywords; and repeating (b)-(k).

19. The system according to claim 15, wherein for each keyword that was not identified in the domain specific dictionary of words at (h) and that was not assigned at (i) a linguistic frequency from the database of linguistic frequencies, assigning each that matches a regular expression from a set of regular expressions a predefined rating, wherein the rating is a weight computed using the following equation:

$$W_{t,d} = F_{t,d} * \log(N/F_t),$$

where:
   $W_{t,d}$: the weight of term t in document d;
   $F_{t,d}$: the frequency occurrence of term t in document d;
   N: the number of documents in the collection of documents;
   $F_t$: the document linguistic frequency of term t in the collection of documents.

* * * * *